United States Patent [19]

Hirosawa

[11] Patent Number: 4,599,916
[45] Date of Patent: Jul. 15, 1986

[54] CONTINUOUSLY VARIABLE TRANSMISSION INCLUDING PLANETARY GEARING

[75] Inventor: Koichiro Hirosawa, Kariya, Japan

[73] Assignee: Aisin Seiki Kabushiki Kaisha, Kariya, Japan

[21] Appl. No.: 587,621

[22] Filed: Mar. 8, 1984

[30] Foreign Application Priority Data

Mar. 10, 1983 [JP] Japan .................. 58-38235

[51] Int. Cl.[4] ............. F16H 37/00; F16H 37/06
[52] U.S. Cl. ........................... 74/689; 74/720.5
[58] Field of Search .............. 74/689, 682, 695, 705, 74/720.5

[56] References Cited

U.S. PATENT DOCUMENTS

| | | | |
|---|---|---|---|
| 3,081,642 | 3/1963 | Emerson | 474/18 |
| 3,091,132 | 5/1963 | Mayfield et al. | 74/720.5 X |
| 3,924,480 | 12/1975 | Carapettucci | 74/689 |
| 4,136,581 | 1/1979 | Winter et al. | 74/689 |
| 4,317,389 | 3/1982 | Falzoni | 74/689 |
| 4,335,629 | 6/1982 | Falzoni | 74/689 |
| 4,449,423 | 5/1984 | Carriere | 74/705 X |

FOREIGN PATENT DOCUMENTS

| | | | |
|---|---|---|---|
| 2651629 | 5/1977 | Fed. Rep. of Germany | 74/689 |
| 911705 | 7/1946 | France | 74/689 |
| 473170 | 7/1952 | Italy | 74/689 |
| 0052653 | 5/1981 | Japan | 74/689 |
| 0049455 | 5/1981 | Japan | 74/689 |
| 0051050 | 3/1982 | Japan | 74/689 |
| 0204362 | 12/1982 | Japan | 74/695 |
| 2054774 | 2/1981 | United Kingdom | 74/689 |

*Primary Examiner*—Kenneth J. Dorner
*Assistant Examiner*—Dirk Wright
*Attorney, Agent, or Firm*—Burns, Doane, Swecker and Mathis

[57] ABSTRACT

A continuously variable transmission suitable for use in an automobile provides a wide range of reduction gear ratio. The gear comprises a gearing and a variable speed change portion. The gearing includes at least three rotating members which form a gear train. One of the three members is connected to the input shaft of the variable-speed gearing, while the two others are connected to speed change members that form a pair in the variable speed change portion, one of the speed change members being driven by the other and connected to the output shaft of the present gear.

5 Claims, 20 Drawing Figures

FIG. 1
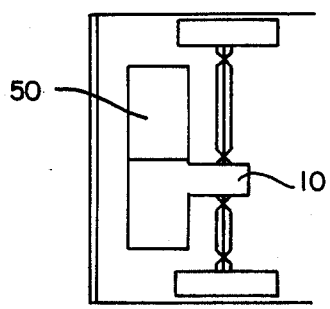
FIG. 2
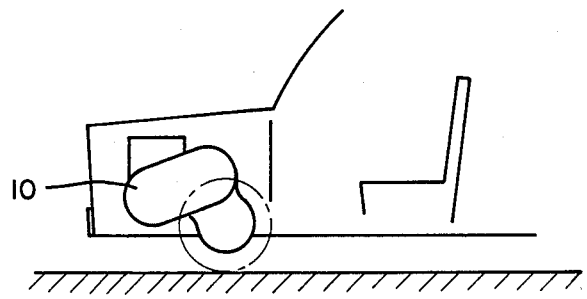
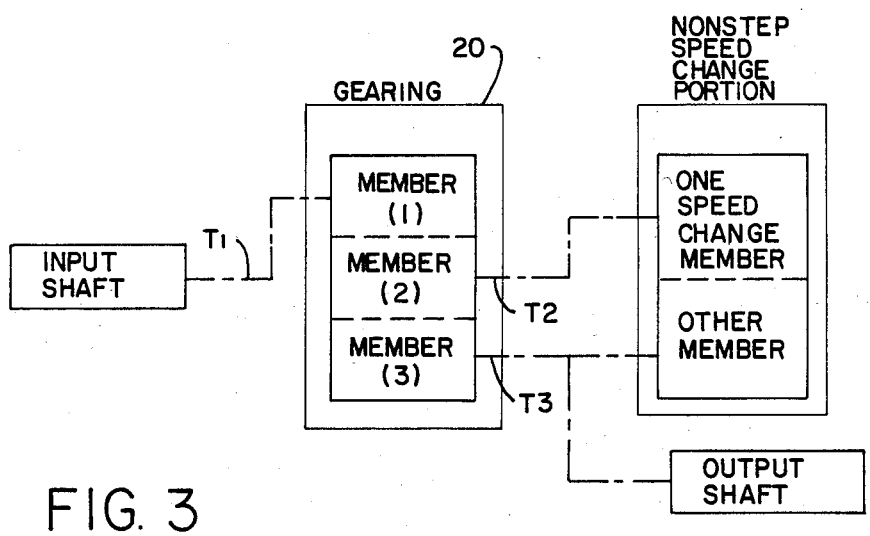
FIG. 3
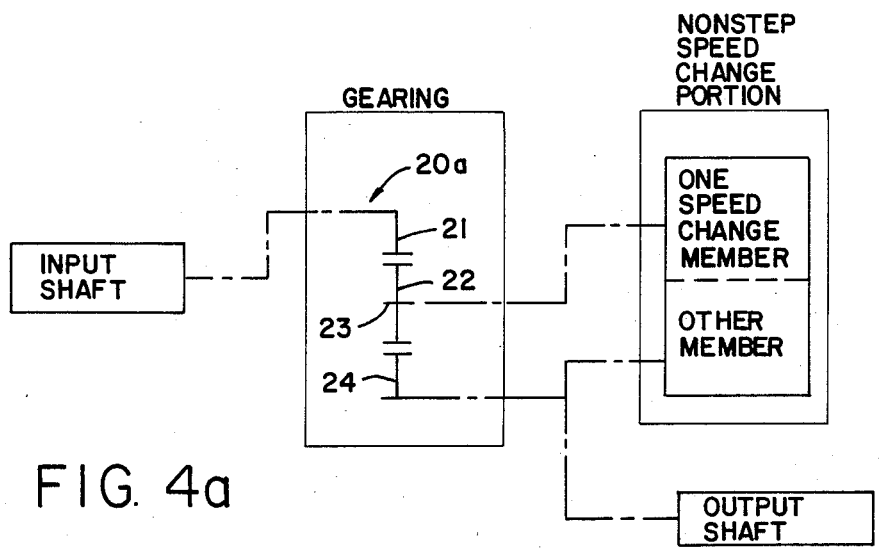
FIG. 4a

CONTINUOUSLY VARIABLE TRANSMISSION INCLUDING PLANETARY GEARING

BACKGROUND OF THE INVENTION

1. Field of the Invention:

The present invention relates to a continuously variable transmission (hereinafter described as CVT) and, more particularly, to a CVT which can change its reduction gear ratio over a wide range although it is compact.

2. Description of the Prior Art:

Various CVT have heretofore been proposed in which the reduction ratios are continuously variable. However, these have the disadvantage that when they are designed to provide a wider range of reduction gear ratio, their dimensions and weights increase.

SUMMARY OF THE INVENTION

Accordingly, it is the main object of the present invention to provide a CVT which can change its reduction gear ratio over a wide range although it is compact and lightweight.

The CVT according to the invention consists of a gearing and variable speed change portion. The gearing is composed of at least three rotating members or units. One of the three members of the gearing is used as the input shaft of the CVT or coupled to the input shaft, while the two other members are directly or indirectly connected to one pair of speed change members (input and output shafts) of the speed change portion, whereby the CVT can obtain a reduction ratio continuously variable over a wide range without the necessity of making the dimensions of the gear larger.

More specifically, the CVT which consists of an input shaft, an output shaft, a gearing disposed between these shafts, and a variable speed change portion is characterized in that the gearing is provided with at least three members to constitute a gear train and that one of the three members is coupled to said input shaft, while the two others are connected to one pair of speed change members of the variable speed change portion. One of the pair of the speed change members drives the other, which is coupled to said output shaft of the CVT.

The aforementioned gearing may be comprised of first and second members, a pinion gear that meshes with these two members, and a third member. The first and second members consist of first and second gears, respectively. The third member consists of a carrier which carries the pinion gear. The gearing of this type preferably takes the form of a planetary gearing which is composed of a sun gear, a ring gear, one or two pinion gears, and a carrier that carries the pinion gear or gears. The sun gear and the ring gear may be replaced by two sun gears, gears having a different shape, or gears arranged in a different way. The third member may carry another idle gear instead of the pinion gears. Various modifications can be made to the gearing, as long as they satisfy the aforementioned condition that the torque on the input shaft is divided into two.

One of the three members of the gearing is connected to the input shaft of the CVT. In case of a planetary gearing, the sun gear and the ring gear act as the first and second members, respectively, and the carrier for the pinion gear serves as the third member. Accordingly, one of the sun gear, the ring gear, and the carrier is connected to the input shaft of the CVT, whereas the two others are connected to one pair of speed change members (input and output shafts) of the variable speed change portion. In this case, one of the two others is coupled to one member (input shaft) of the pair, the other being connected to the other (output shaft). CVT respectively employing a belt, a spherical transmitting means, and a frictional transmitting means can be used for the variable speed change portion.

In one preferred aspect of the invention, the torques $T_1$, $T_2$, and $T_3$ distributed to the first, second, and third members, respectively, are so set that the relationship $T_3 < T_1 < T_2$ holds, provided that the member of the gearing which is continuous with the input shaft is used as the first member and that the other members are used as the second and third members. In case where the power transmission portion has a reduction ratio of $i_2$, the torques $T_2$ and $T_3$ applied to the second and third members are so set that $$T_2' = T_2 i_2$$

or $$T_3' = T_3 i_2$$

holds, taking into account that reduction ratio. The result is that the relation $T_3$ (or $T_3'$) $< T_2$ (or $T_2'$) is established.

The connection between the gearing and the variable speed change portion may be achieved by directly connecting together the associated members. In case where the input and output shafts of the variable speed-change portion are disposed in parallel relation, both shafts can be so coupled as to be rotatable in the same direction by the use of a power transmission portion which comprises gears, belts, chains, or other known means. It is also possible to maintain the reduction ratio $i_2$ of the power transmission portion constant as the need arises.

According to the construction described above, even if a small-sized variable speed change portion whose range of reduction ratio is limited is used, the combination of the gearing and the speed change portion can make the range of the reduction ratio of the whole CVT considerably greater than that obtained when only the variable speed change portion is used. Further, the torque imposed between the speed change member and the power transmission member, such as a belt, of the speed change portion is reduced greatly, thus contributing to an improvement in the durability of the CVT.

Other objects and features of the invention will apparent in the course of description thereof which follows.

BRIEF DESCRIPTION OF THE DRAWINGS

FIGS. 1 and 2 are a plan view and a side elevation, respectively, of the front portion of an automobile equipped with a CVT according to the present invention;

FIG. 3 is a block diagram of one example of the CVT according to the invention;

FIGS. 4a, 4b, 5a, 5b, 6a, 6b, 7 and 8 are block diagrams of other examples of the CVT according to the invention.

DETAILED DESCRIPTION OF THE INVENTION

Referring first to FIGS. 1 and 2, CVT 10 employing the concept of the present invention is suitable to an automobile transmission, particularly the transmission of a front-drive automobile.

The novel CVT is illustrated conceptually in FIG. 3, where one (indicated by numeral 1) of the three members of the gearing 20 is connected to the input shaft, while the two others 2, 3 are connected to their respective ones of a pair of speed change members in the variable speed change portion. One of the speed change member, in the example shown the lower one, is coupled to the output shaft.

Figure 4B:
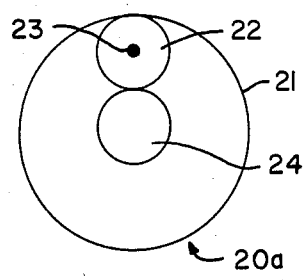

Referring next to FIG. 4a, the gearing 20 takes the form of a planetary gearing 20a which includes a ring gear 21, a pinion gear 22, a carrier 23 that carries the gear 22, and a sun gear 24. The ring gear 21 is linked to the input shaft, and the sun gear 24 of the remaining two members is connected either to the output shaft or to the other speed change member. One example of this planetary gearing 20a is shown in FIG. 4b. Although the planetary gearing 20a is connected to the input shaft through the ring gear in the example shown in FIG. 4a, it is also possible to connect either the carrier 23 or the sun gear 24 to the input shaft.

Figure 5A:
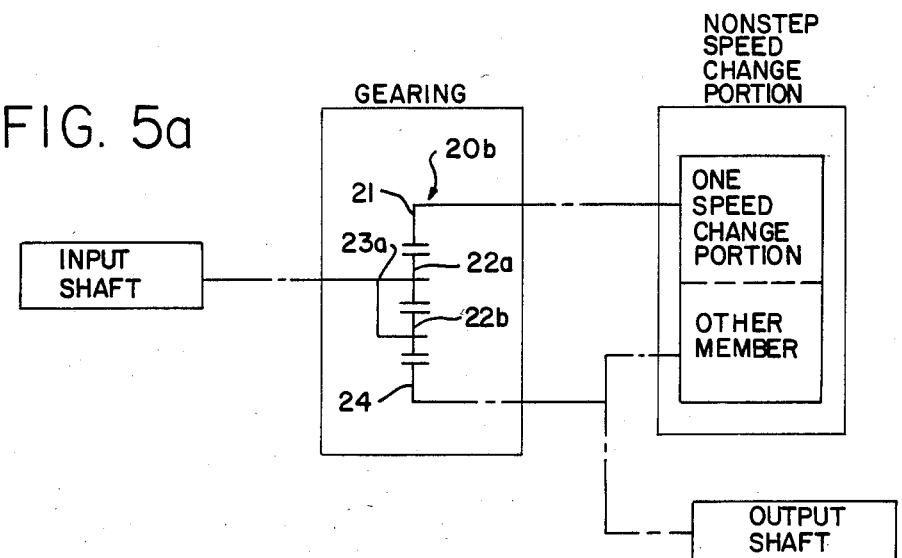
Figure 5B:
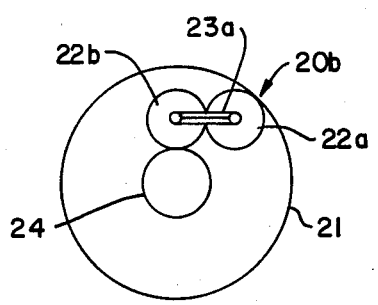

Referring to FIG. 5a, there is shown a twin-pinion gear type planetary gearing which includes twin pinion gears 22a, 22b, and a carrier 23a that carries these gears. The carrier 23a is connected to the input shaft, and the sun gear 24 is joined to the output shaft.

Figure 6A:
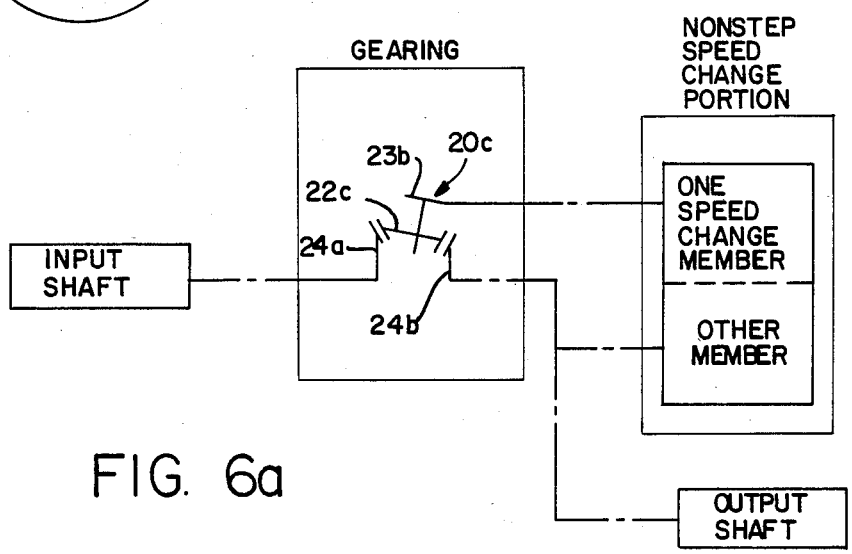
Figure 6B:
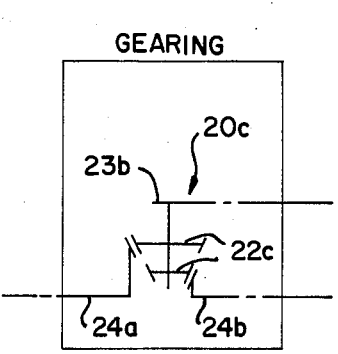

Referring to FIG. 6a, there is shown a further example of the CVT using a gearing 20c which is equipped with a first sun gear 24a, a second sun gear 24b, a pinion gear 22c that meshes with both sun gears, and a carrier 23b which carries the pinion gear 22c. One specific example of the construction of the gearing 20c is shown in FIG. 6b.

Figure 7:
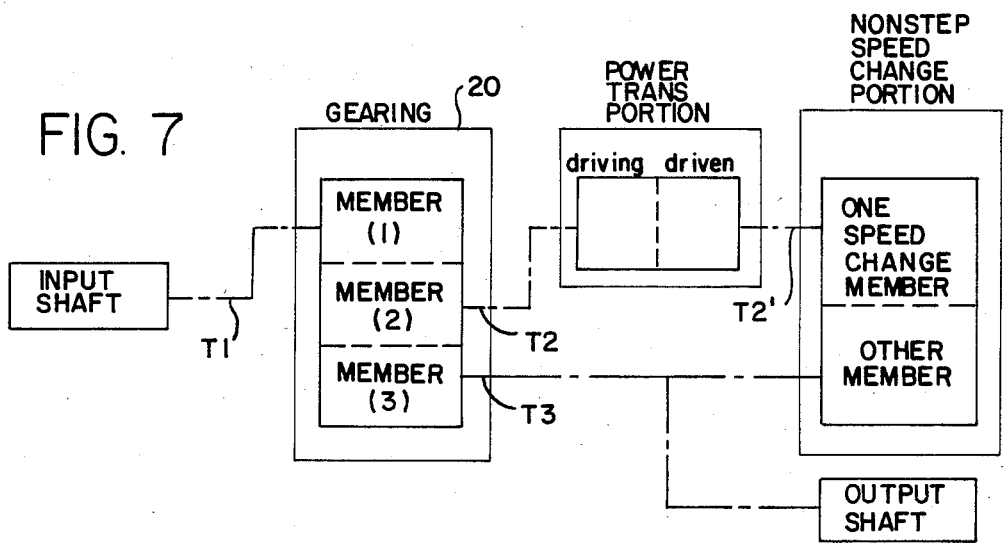

Referring next to FIG. 7, there is shown a still further example of the CVT, in which one (indicated by numeral 2) of the members of the gearing 20 not connected with the input shaft is connected via the power transmission portion to one of the speed change members of the variable speed change portion. Let $T_1$, $T_2$, $T_3'$, and $T_2'$ be the torques respectively imposed on the input shaft, the member 1, the member 2, and the driven section of the power transmission portion that is coupled to one of the speed change members of the speed change portion. The rotational velocity of the input shaft is so lowered and transmitted that the relation $T_3 < T_2'$, preferably $T_3 < T_1 < T_2'$, more preferably $T_3 < T_1 < T_2'$ holds.

Figure 8:
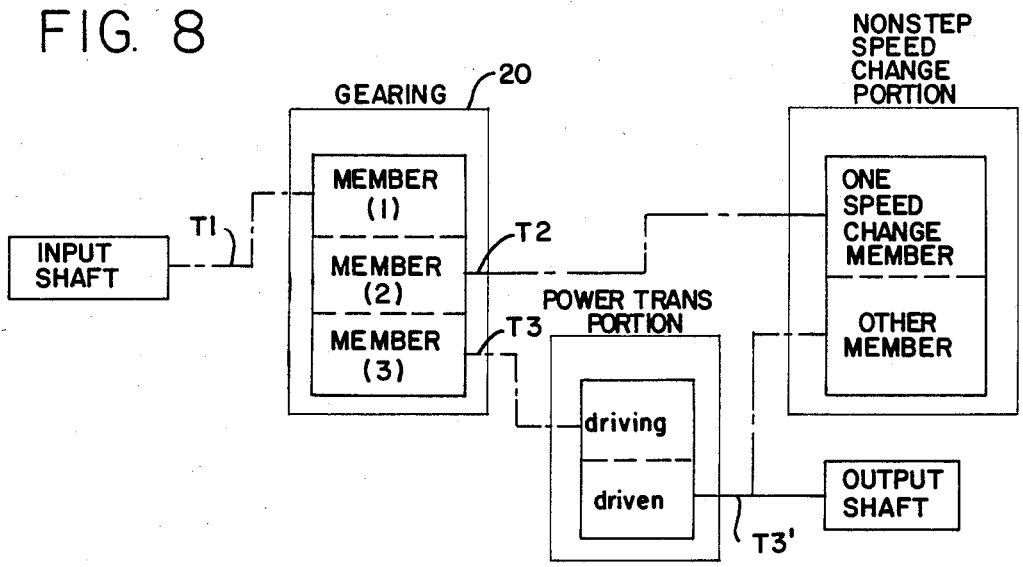

The arrangement shown in FIG. 8 differs from that shown in FIG. 7 in that the member 3 of the gearing 20 and the other speed change member of the variable speed change portion are connected together through the power transmission portion and also connected to the output shaft. In this case, the relationship $T_3' < T_2$ holds between the rotating speeds of the shafts, where $T_3'$ is the rotating speed of the driven section of the power transmission portion. Preferably the relation $T_3' < T_1 < T_2'$, more preferably the relation $T_3 < T_1 < T_2$ holds, similarly to the foregoing case.

More specific and preferred examples of the invention are hereinafter described with reference to the drawings, but it is to be understood that the present invention is not limited to these examples.

Figure 9:
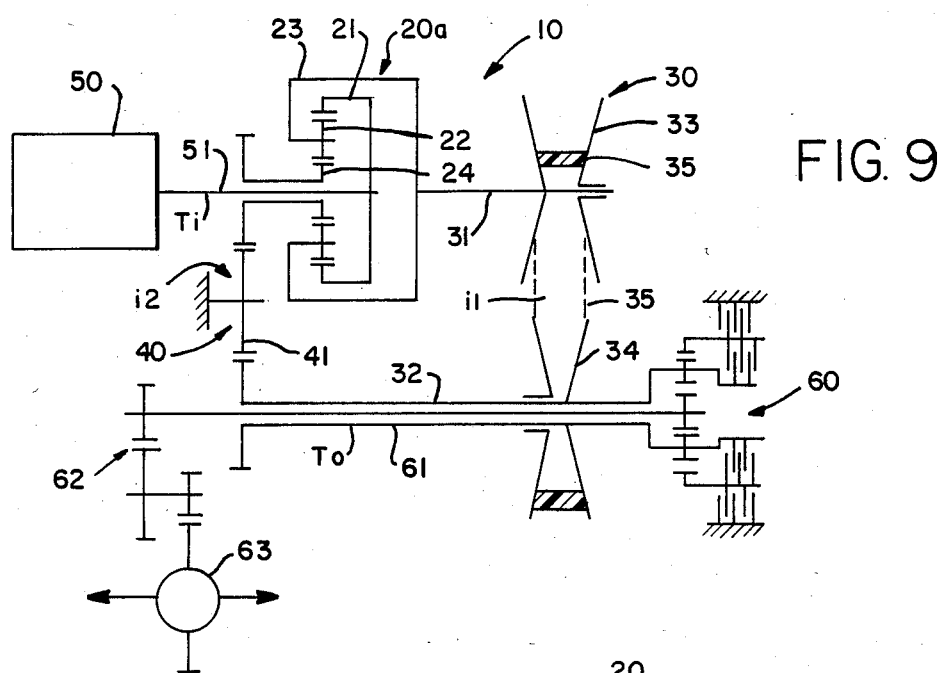
FIGS. 9–17 are schematic representations of examples of the CVT according to the invention.

The CVT 10 shown in FIG. 9 is placed between the internal combustion engine 50 and the clutch mechanism 60 of an automobile to which the invention is applied. The gear 10 is composed principally of a planetary gearing 20 and a variable speed change portion 30. The gearing 20 comprises a ring gear 21 connected to the output shaft 51 of the engine 50, a carrier 23 that carries a pinion gear 22 and is connected to the input shaft 31 of the speed change portion 30, and a sun gear 24. This sun gear is linked to the output shaft 32 of the speed change portion 30 via a gearing 40 which constitutes a power transmission portion. Now let $\rho$ be the radius ratio of the planetary gearing 20, i.e., the ratio of the number of the teeth of the sun gear $Z_s$ to the number of the teeth of the ring gear $Z_R$.

The speed change portion 30 is a speed change arrangement using a belt and comprises a pulley 33 mounted on the input shaft 31, another pulley 34 mounted on the output shaft 32, and a belt 35 trained around the pulleys. The width of one or both of the pulleys is adjusted by a certain operation device (not shown) to vary the reduction gear ratio $i_1$. As described previously, the output shaft 32 of the speed change portion 30 is connected to the sun gear 24 via the gearing 40 consisting of a gear 41. Let $i_2$ be the reduction ratio of the gearing 40.

In the speed change system constructed as described above, let $T_i$ be the torque transmitted from the output shaft 51 of the engine 50, that is, the torque applied to the input shaft connected to the ring gear 21. Then, the carrier 23 is subject to a torque $(1+\rho) T_i$, which is applied to the speed change portion 30. Accordingly, the torque component $(1+\rho) T_i \cdot i_1$ is transmitted to the pulley 34 on the output side. Meanwhile, the sun gear 24 produces a torque $\rho T_i$, which is changed to a torque component $\rho T_i \cdot i_2$ and transmitted to the output side by the gearing 40. Therefore, the output shaft 32 delivers a torque $T_0 = (1+\mu) T_i \cdot i_1 - \rho T_i \cdot i_2'$ and the total reduction ratio of the whole CVT is $T_0/T_i = (1+\rho) i_1 - \rho \cdot i_2$.

The novel CVT is next discussed numerically. Now suppose that the radius ratio $\rho$ of the sun gear of the planetary gear to the ring gear is 0.35, the belt reduction ratio $i_1$ of the speed change portion 30 changes from ½ to 2, and the reduction ratio $i_2$ of the gearing $40 = 1.0$. When the input torque is $T_i$, the output torque delivered by the output shaft can very from $T_0 = (1+0.35) T_i \times 2 - 0.35 T_i \times 1 = 2.35 T_i$ to $(1+0.35) T_i \times \frac{1}{2} - 0.35\ T_i \times 1 = 0.325\ T_i$. The reduction ratio and its range obtained in this way are compared with those obtained by a conventional belt type CVT alone in the following table.

|  | reduction ratio | range of ratio |
| --- | --- | --- |
| the invention | 2.35 to 0.325 | 7.23 |
| Prior art (belt type) | 2 to ½ | 2 ÷ ½ = 4 |

As can be seen from the above table, the CVT of the present example makes use of the planetary gearing to enlarge the range of the reduction ratio conspicuously. Hence, when it is desired to make the range of the reduction ratio of the whole CVT substantially as large as the conventional system, the dimensions of the variable speed change portion can be rendered small, whereby the whole CVT can be miniaturized.

In the above example, the output shaft 32 whose speed is controlled in a variable manner as already described is connected via the clutch mechanism to an output shaft 61 which is disposed coaxially with the output shaft 32 of the speed change portion 30. The clutch mechanism 60 is shown on the left side in FIG. 9 and is comprised of a planetary gear train including the brake and the clutch means. The output shaft 32 is further connected to wheels (not shown) on both sides via gear train 62 and a differential gear 63.

The CVT 10 in this example is coupled to the engine 50 at all times, and therefore the speed change portion 30 can effect its speed change operation even when the clutch mechanism 60 is let out. By causing the gear 10 to cooperate with a certain control system, the automobile can readily be set in motion with a low reduction gear ratio, resulting in a high acceleration.

Figure 10:
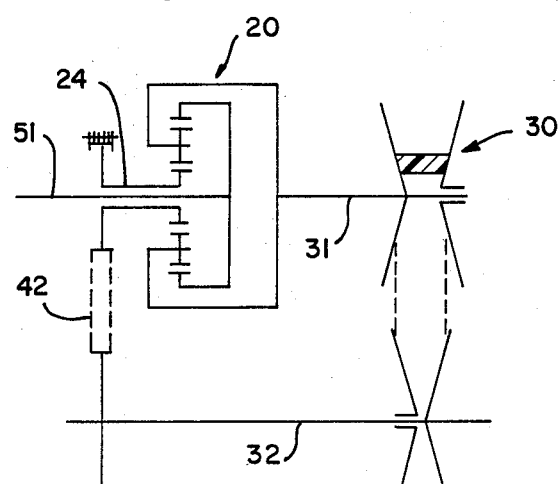
Figure 11:
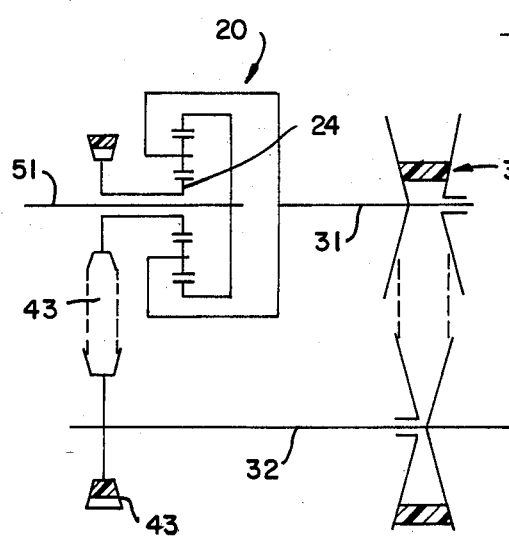

FIGS. 10 and 11 show other examples of CVT which are essentially similar in structure to the gear shown in FIG. 9. The example of FIG. 10 differs from the gear of FIG. 9 in that the power transmission means connecting the sun gear of the planetary gearing to the output shaft takes the form of a chain 42. In the example of FIG. 11, the power transmission means takes the form of a V-belt 43.

Figure 12:
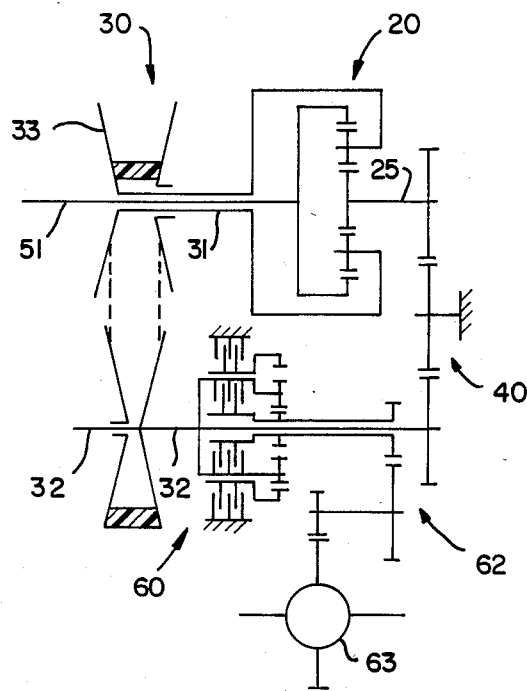

The CVT shown in FIG. 12 is similar in fundamental principle to the gear of FIG. 9 but differs in arrangement of the mechanisms. In particular, the pulley 33 on the input side of the variable speed change portion is mounted on the output shaft 51 of the engine coaxilly, and the output shaft 25 of the sun gear of the planetary gearing 20 extends to the right of the figure. The clutch mechanism 60 is mounted on the output shaft 32 of the variable speed change portion 30 coaxially.

Figure 13:
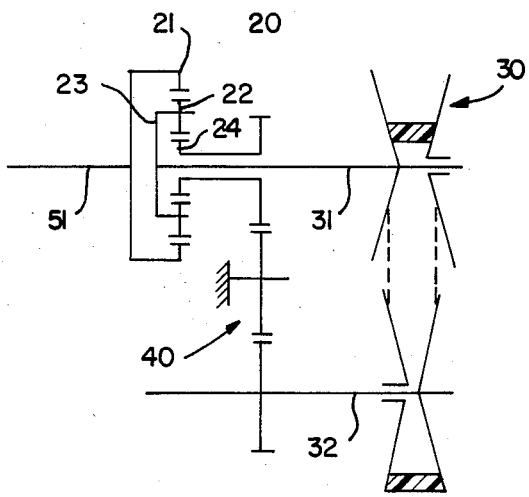

The CVT shown in FIG. 13 is essentially similar to the gear of FIG. 9 except that the input and output of the planetary gearing 20 are reversed.

Figure 14:
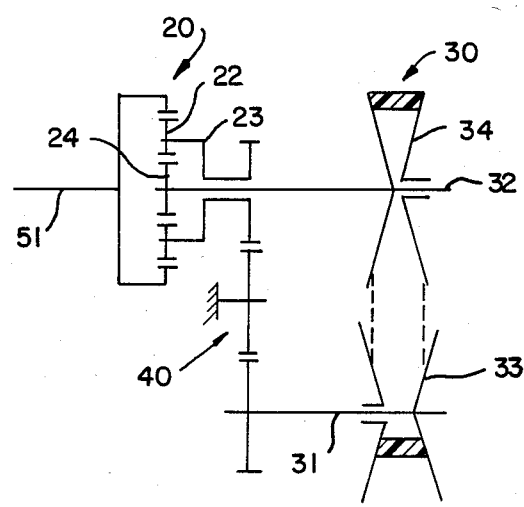

The CVT shown in FIG. 14 is also essentially similar to the gear of FIG. 9 but that the input and output shafts of the variable speed change portion 20 are reversed. Specifically, the input shaft 31 of the variable speed change portion 30 is located at a lower position in the figure and is connected to the carrier 23 by gear 40. The output shaft 32 of the speed change portion 30, i.e., the output shaft of the CVT 10 is aligned with the center axis of the sun gear 24. Consequently, the present gear is advantageous in providing a coaxial arrangement of the input and output shafts. It is to be noted that in this illustrative example the output shaft 32 can be connected to the input shaft 31 of the speed change portion.

Figure 15:
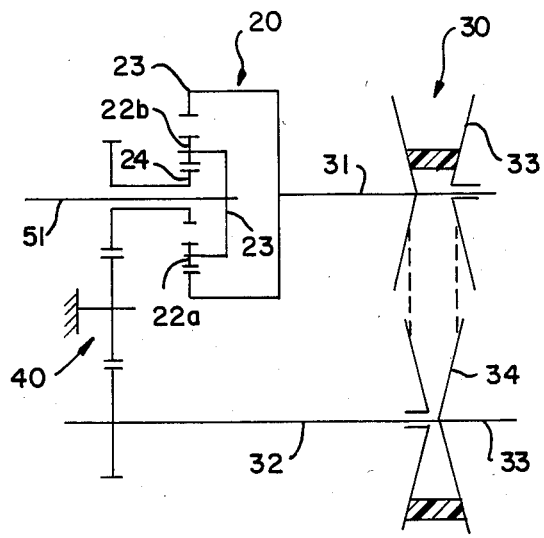

FIG. 15 shows a yet further example of the CVT, in which the planetary gearing has twin pinions. To be specific, the input shaft 51 is connected to the carrier 23 which carries a first pinion 22a and a second pinion 22b. The ring gear 23 is linked to the input shaft 31 of the variable speed change portion 30. The sun gear 24 is connected to the output shaft 32 of the speed change portion 30 via the gearing 40.

Figure 16:
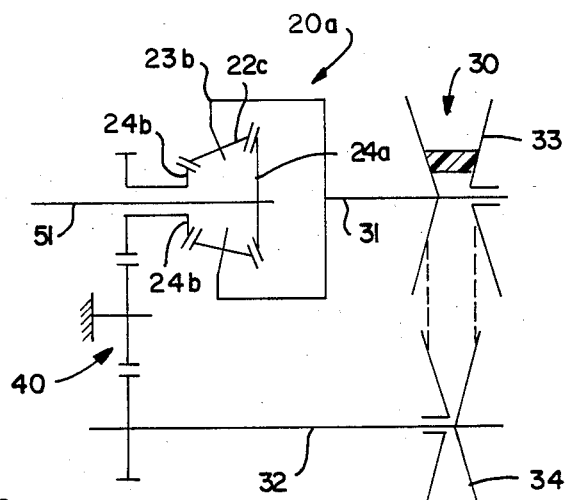

The CVT shown in FIG. 16 is similar in construction to the gear of FIG. 3 except for the gearing 20, which consists of a first sun gear 24a connected to the input shaft, a second sun gear 24b connected via gearing 40 to the output shaft 32 of the variable speed change portion 30, a pinion gear 22c meshing with both sun gears 24a, 24b, and a carrier 23b carrying the pinion gear. The carrier 23b is connected to the input shaft 31 of the speed change portion 30.

Figure 17:
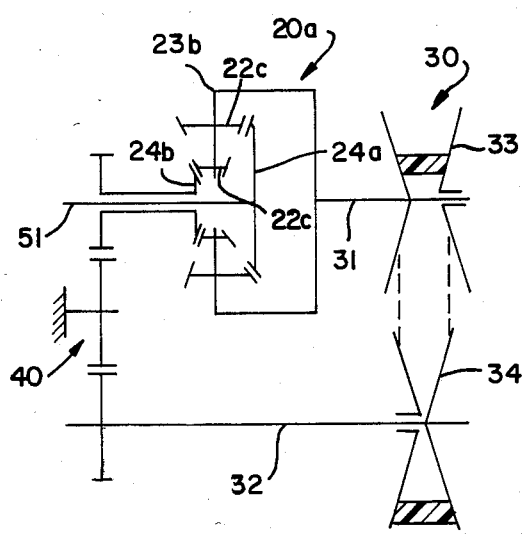

The CVT shown in FIG. 17 is essentially similar to the gear of FIG. 16, where a single pinion 22 meshes with the first gear 24a and second sun gear 24b, but in the gear of FIG. 17 one pair of pinion gears 22c, which are carried by the same carrier 23b, meshes with the sun gears 24a and 24b.

While the invention has been particularly shown and described with reference to preferred embodiments thereof, it will be understood by those skilled in the art that various changes in form and detail can be made therein without departing from the spirit and scope of the invention.

What is claimed is:

1. A continuously variable transmission comprising;
an input shaft,
an output shaft,
a gearing interposed between the input and output shafts and having at least three members which form a gear train,
a clutch mechanism interposed between the gearing and the output shaft,
a variable speed change portion having a pair of speed change members,
one of said three members being connected to the input shaft, the two others of said three members being connected respectively to the speed change members forming the pair in the variable speed change portion,
one of said speed change members which form the pair being driven by the other and connected to the output shaft the gearing including a first and a second members consising of a first and a second gears, respectively, and third members consisting of a single pinion gear and a carrier, the pinion gear meshing with the first and second members, the pinion gear being carried by the carrier, the third member connected to the input shaft, and wherein the first and second members are connected to their respective ones of said speed change members which form the pair.

2. A continuously variable transmission as set forth in claim 1, wherein at least one of the two others of the gearing which are not connected to the input shaft is connected to the speed change members of the variable speed change portion via a power transmission portion.

3. A continuously variable transmission as set forth in claim 1, wherein the gearing consists of a planetary gearing composed of a sun gear, a ring gear, a pinion gear, and a carrier that carries the pinion gear.

4. A continuously variable transmission as set forth in claim 1, wherein the gearing consists of a first sun gear, a second sun gear, a pinion gear meshing with the two sun gears, and a carrier that carries the pinion gear.

5. A continuously variable transmission as set forth in claim 3, wherein there is provided another pinion gear similar to the single pinion gear.

* * * * *